United States Patent [19]
Sparling

[11] 3,944,885
[45] Mar. 16, 1976

[54] ELECTRIC LOAD RESTRICTION UNIT

[75] Inventor: Robert H. Sparling, Salida, Colo.

[73] Assignee: The Raymond Lee Organization, Inc., New York, N.Y. ; a part interest

[22] Filed: Oct. 22, 1974

[21] Appl. No.: 516,890

[52] U.S. Cl. .................... 317/9 R; 307/39; 317/16
[51] Int. Cl.² ........................................ H02J 3/14
[58] Field of Search ....... 307/39; 335/107; 317/9 R, 317/16

[56] References Cited
UNITED STATES PATENTS
3,486,033    12/1969    Salo ..................................... 307/39

FOREIGN PATENTS OR APPLICATIONS
274,357    3/1951    Switzerland ....................... 335/107

*Primary Examiner*—J. D. Miller
*Assistant Examiner*—Harry E. Moose, Jr.
*Attorney, Agent, or Firm*—Howard I. Podell

[57] ABSTRACT

An electric load restriction device which conserves the secondary use of electricity during a period of a power shortage by causing selected load circuit breakers to open, in response to a change of frequency in the supplied primary electrical energy. The device is electrically connected to individual selected circuit breaker output connections mounted in a conventional electrical distribution box. The device is fitted with a frequency sensing device that actuates a solenoid, when the incoming electrical frequency falls below a normal valve, with the contactors of the solenoid, in the closed position sending an overload current to the load side of each of the selected load circuit breakers to cause the selected load circuit breakers to open. The solenoid is fitted with pivotably mounted contact arm, with the solenoid contact arm initially contacting the switch contacts of the individual overload circuits sequentially as the contact arm is caused to rotate into a plane parallel to the common contact plane of these switch contacts by the linear motion of the solenoid contact arm as the solenoid coil causes the arm to move towards the switch contacts.

2 Claims, 2 Drawing Figures

ELECTRIC LOAD RESTRICTION UNIT

SUMMARY OF THE INVENTION

My invention is an electric load restriction device which conserves the secondary use of electricity during a period of a power shortage by causing selected load circuit breakers to open, in response to a change of frequency in the supplied primary electrical energy. The device is electrically connected to individual selected circuit breaker output connections mounted in a conventional electrical distribution box. The device is fitted with a frequency sensing device that actuates a solenoid, when the incoming electrical frequency falls below a normal valve, with the contactors of the solenoid, in the closed position sending an overload current to the load side of each of the selected load circuit breakers to cause the selected load circuit breakers to open.

The solenoid is fitted with a pivotably mounted contact arm, with the solenoid contact arm initially contacting the switch contacts of the individual overload circuits sequentially as the contact arm is caused to rotate into a plane parallel to the common contact plane of these switch contacts by the linear motion of the solenoid contact arm as the solenoid coil causes the arm to move towards the switch contacts.

The advantage of my invention is that the slowing of the power source generator, in such a system, results in a lowering of the frequency of the supplied electrical current and automatically triggers the operation of the invention to reduce branch circuit use of supplied electrical energy.

BRIEF DESCRIPTION OF THE DRAWINGS

The objects and features of the invention may be understood with reference to the following detailed description of an illustrative embodiment of the invention, taken together with the accompanying drawings in which.

Figure 1:
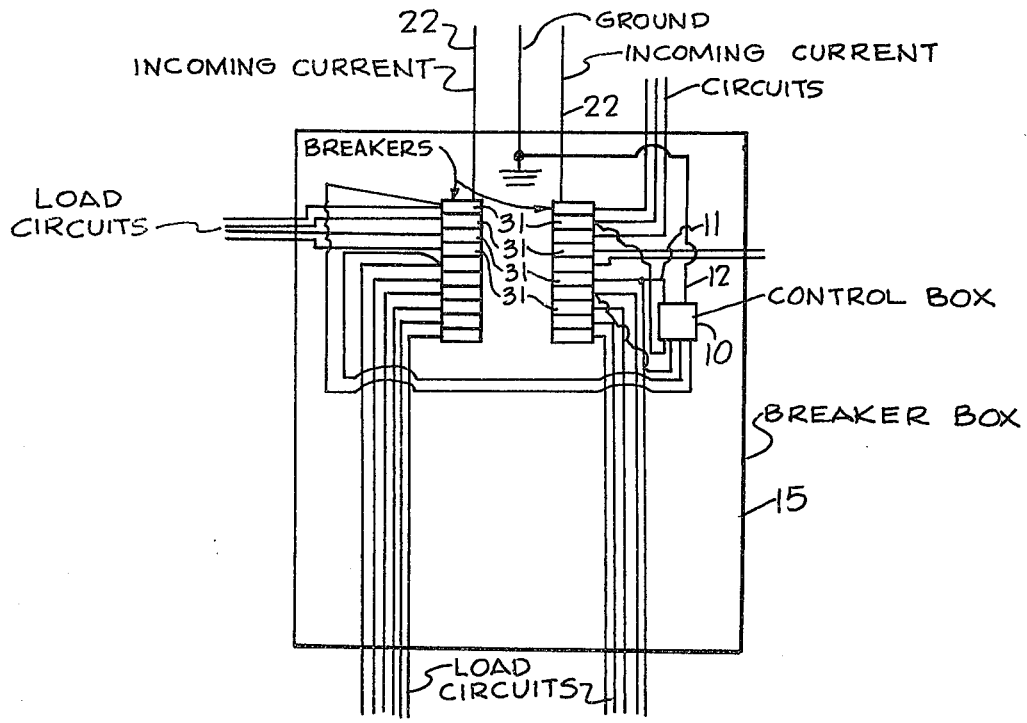
FIG. 1 is a schematic diagram of the invention in use.
Figure 2:
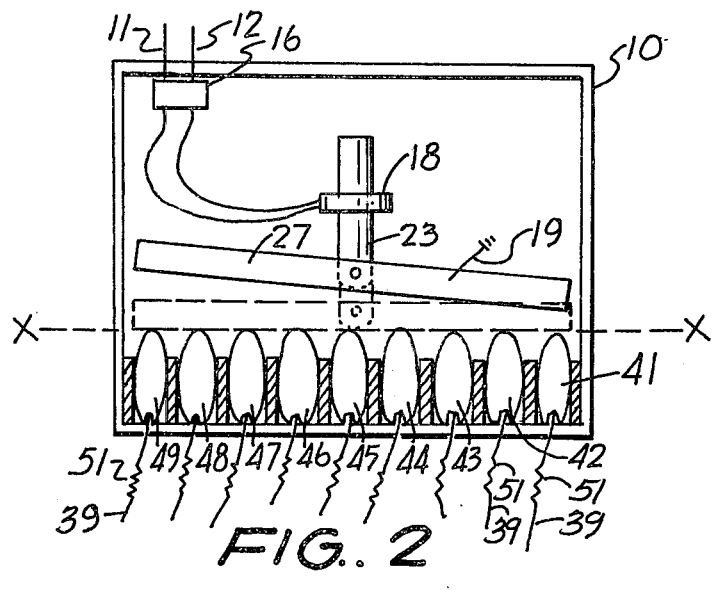
FIG. 2 is a sectional view of the invention.

DESCRIPTION OF THE PREFERRED EMBODIMENT:

Turning now descriptively to the drawings, in which similar reference characters denote similar elements throughout the several views, FIGS. 1-2 illustrate a control box 10 electrically connected by wires 11 and 12 to the ground conductor 21 and an incoming electric power line conductor 22 of a circuit breaker load distribution center 15. Individual circuit breakers 31 of center 15 are each connected to an incoming power line conductor 22 with circuit breakers 31 in series with individual load circuits of a secondary nature which may be opened to reduce power consumption when the frequency of the power line reduces below a normal valve, signalling the need for power use reduction.

The line frequency is sensed by a frequency control switch 16 which sends current to a solenoid coil 18 when the line frequency falls to a pre-determined level.

Solenoid coil 18, when energizes, drives solenoid shaft 23 towards switch contact points 41-49, with contact points 41-49 mounted along a common contact plane X—X.

An electrical contactor arm 27 is pivotably mounted to the forward end of solenoid shaft 23 so that in the engaged position, arm 27 engages all contact points 41-49. A ground wire 19 is connected to arm 27, with some contact points 41-49 each individually connected by wires 39 to the load side of an individual circuit breakers 31 serving a load of secondary need. A resistance 51 of suitable rating is individually joined to each wire 39 to limit the overload current led to each circuit breaker 31 so that each circuit breaker 31 opens rapidly after its switch contact 41-49 is engaged by contactor arm 27.

Arm contactor 27 is fitted with spring bias means to rotate the contact surface of arm 27 to a plane that is at an acute angle to plane X—X of the switch contacts 41-49 when contactor arm 27 is free of engagement with a contact points 41-49. Consequently, as contactor arm 27 is moved by shaft 23 towards contact points 41-49, arm 27 first engages contact 41, before engaging any other contact 42-49. This initial contact acts to rotate arm 27 so that its contact surface becomes parallel with plane X—X of contacts 41-49, and the combination of this rotational motion with the linear motion of shaft 23 causes arm 27 to sequentially make contact, one at a time, with the remaining contacts 42-49, in that order.

Consequently, the overload currents through resistors 51 to the individual circuit breakers 31 occurs in sequential steps rather than simultaneously and limits the magnitude of the overload current drawn from the incoming power line 22 in tripping circuit breakers 31.

When the power shortage period has terminated, breakers 31 may be manually reset. Alternately frequency responsive means may be employed with electrically energized actuators to reset the individual circuit breakers, or the circuit breakers may be provided with an additional coil and structure to provide other electrically actuated reset means.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An electrical mechanism for reducing the secondary load of an overloaded primary electrical power supply comprising:
    a primary electrical power supply circuit connected to a source of alternating current, the frequency of which is reduced when the said primary circuit is overloaded,
    a plurality of secondary electrical circuits each connected to the primary circuit by an individual circuit breaker,
    a solenoid fitted with a contact arm actuated by an electrical coil, and fitted with a contact engaged by the contact arm only when the coil is energized,
    electrical switching means responsive to electrical line frequency, which energizes the solenoid coil when the connected line frequency falls below a pre-selected valve,
    said contact being individually electrically connected to the load side of an individual secondary load circuit, and
    said contact arm connected to an electrical ground connection, such that energization of the solenoid coil by the frequency responsive switching means causes an initial increase in the secondary load circuit connected to the contact to cause the circuit breaker of said secondary circuit to open and interrupt all current flow to the said secondary circuit, so as to reduce the load of the primary electrical power supply circuit.

2. The combination as recited in claim 1 in which the solenoid is fitted with a plurality of contacts each engaged sequentially by the contact arm when the solenoid is actuated, each said contact being connected to the load side of an individual secondary load circuit, such that a plurality of secondary load circuits are sequentially disconnected by the opening of the individual circuit breaker connected to the respective secondary load circuit.

* * * * *